Figure 1:
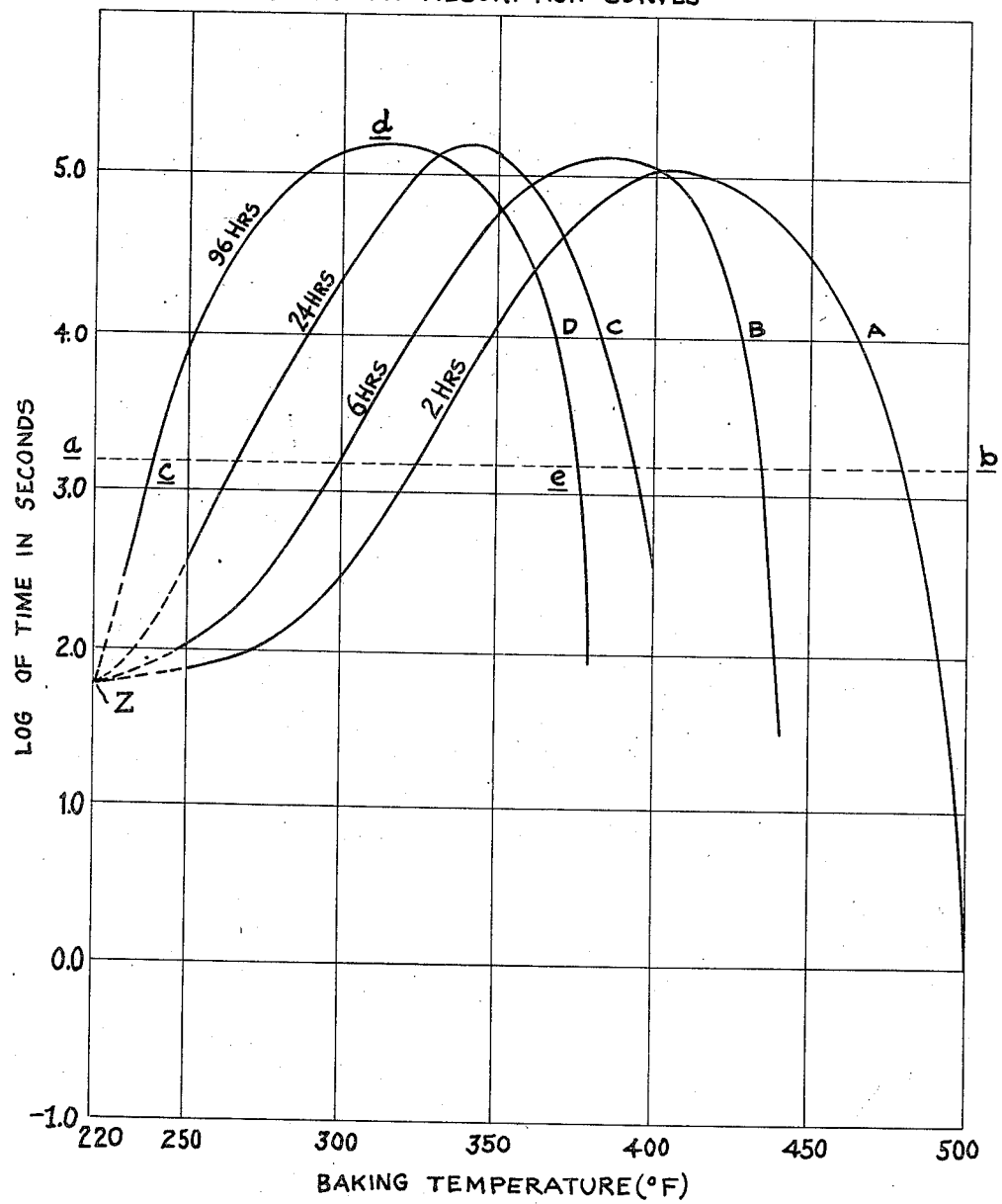

United States Patent Office

2,800,415

ASPHALTIC MAGNESIA COMPOSITION AND METHOD OF PRODUCING THE SAME

Willard R. Seipt, North Wales, Pa., assignor to Keasbey & Mattison Company, Ambler, Pa., a corporation of Pennsylvania Application June 10, 1954, Serial No. 435,795

3 Claims. (Cl. 106—121)

This invention relates to the manufacture of magnesia insulation of the type known to the trade as "85% magnesia." More particularly the invention is concerned with a method for imparting a substantial degree of water repellency to 85% magnesia and providing an insulation material which is capable of withstanding conditions of drenching, soaking, submergence, or flooding, more fully described hereinafter.

The compositions commonly referred to as 85% magnesia are essentially a basic magnesium carbonate to which reinforcing fibres have been added to impart mechanical strength to the material. Generally the reinforcing fibres are asbestos, although other similar fibres can be used. 85% magnesia is a light weight material, having relatively good mechanical strength, and possessing many other characteristics which render it ideally suitable for a great many types of applications as a thermal insulation material. It is particularly adapted for use as covering or insulating material for steam and other piping, hot vessels of various kinds and like equipment.

The improvements of the present invention can be successfully employed with any of the currently known general types of processes and variations thereof for the production of 85% magnesia insulation or other molded articles prepared from hardenable slurries of carbonated magnesia.

Most of the 85% magnesia insulation is at present prepared either by the method known as the "filter mold process," or by the method known as the "set process."

In the filter mold process, an aqueous slurry containing about 8% basic magnesium carbonate is admixed with a quantity of asbestos fibres ranging from about 10% to 15% of the combined weight of fibre and basic carbonate to provide a slurry of about 9% solids. This slurry is dewatered until it contains approximately 15% solids, by forcing it under pressure into a filter type mold approximating the shape of the article to be produced. The molds are about 60% oversize in volume; for this allows for shrinkage which occurs upon hardening of the article by drying and also to allow for subsequent trimming the article to size.

The oversize molded article is removed from the mold and is air-dried or cured at temperatures of about 240° F. for a period of approximately one week. Thereafter, the hardened article is trimmed to size.

In the set process, an aqueous slurry of normal magnesium carbonate is used; the slurry at the outset contains approximately 20% solids. Asbestos fibres, in an amount ranging from 7% to 11% of the combined weight of fibre and normal carbonate are incorporated in this slurry and the temperature of the slurry is adjusted to approximately 140° F. This warm slurry containing about 20% solids is then cast in an open mold accurately conforming with the shape and size of the article to be made. This mold is provided with a water jacket through which hot water, i. e., at about 200° F. is circulated. After a residence time in the mold of about 12 minutes during which substantially all of the normal carbonate is converted to the basic carbonate, the article will be set and hardening will have been substantially completed. The set article is removed from the mold and dried. In order to expedite drying, temperatures are used which range from 300° to 400° F. for about one day. In this process there is no substantial degree of shrinkage and it is unnecessary to trim the molded article to size.

A third process, which is a combination of the filter mold process and the set process has also been used for the production of 85% magnesia insulation. A slurry of about 5-8% solids in water is prepared, containing normal magnesium carbonate and asbestos fibre, the latter, in an amount ranging from 7% to 11% of the solids. The normal magnesium carbonate in the slurry is pre-reacted by heating a charge to temperatures in the region of 150° F. for from about 1 to 3 minutes. The pre-reacted charge is then fed to a filter mold and pressure applied for a limited time to partially dewater the charge, thus yielding a formed article having a harder, denser shell and a softer, lighter core. The average concentration of solids in the partially dewatered charge is in the order of 20%. Then, the formed article either confined within the mold, partly confined within perforated cover plates or completely freed, is subjected to water heated to about 200° F. by either forcing the water through the confined article, or by immersing the article, in the confined state or otherwise, in a bath of hot water for a period of from 5 to 10 minutes. The operation causes the article to acquire a partial set. The final set and the drying occurs in an oven heated to 220-350° F. for a period of about one to two days. No shrinkage develops upon drying in this process so that the articles are molded to finished dimensions, without the necessity of trimming them.

Although known types of 85% magnesia have many characteristics which make such insulation ideally suited for use as an insulating covering for steam piping, and similar purposes, certain of its physical characteristics tend to limit and restrict the uses to which the insulation can be put. An example of such limiting characteristics arises in cases where the insulation is used on hot piping or equipment subjected to occasional or periodic external drenching, soaking, or submergence in water or other liquids. By such flooding the liquid is rapidly adsorbed by the porous insulation, seeps through the joints of the covering, and accumulates in the space between the insulation and the hot outer surface of the equipment. When the temperature of the heated surface is sufficient to vaporize the liquid trapped in the porous covering and/or that which has accumulated between the cover and surface, pressures tend to develop due to the inability of the vapors to escape readily. These pressures are in many instances sufficient to cause the insulation to break, crack, erode, or be otherwise damaged to a degree which frequently necessitates a partial or complete replacement of the insulation covering. Some damage to the insulating covering may also occur during the drying out period following a submergence and this condition will be aggravated by repeated cycles of submergence and drying out. In addition, a wet insulation is less efficient as an insulator.

Heretofore various attempts have been made to solve the above and other problems arising from the high degree of water absorbency, and the rapid rate at which water is absorbed by 85% magnesia insulation. Among these efforts are proposals to provide a water-resistant seal or coating on the surface of the insulating piece; there have also been proposals to incorporate various hydrophobic materials in the insulating material itself, including asphalt and other hydrophobic substances, which render the magnesias water resistant to a minor extent. However, these proposals have not satisfactorily answered certain of the problems, especially the tendency for the insulation to disintegrate under submergence conditions as aforesaid. In other words the water repellency of the magnesia has not been raised to a point where the article can be effectively used under conditions of submergence or flooding. Further, and particularly when used as insulation for out-door equipment, coated insulation will allow water to seep in at points where the coating has broken or separated and wet the insulation; wetted insulation has a lower thermal efficiency.

Accordingly, it is one of the objects of this invention to provide a method of producing magnesia insulation which has a high degree of water repellency and which, at the same time, will not adversely affect desirable thermal insulating and other properties of the material.

It is a still further object of this invention to provide a magnesia insulating material which is capable of withstanding prolonged drenching, soaking, or submergence in water and which, after such exposure, will dry out without any substantial detrimental effects, particularly with respect to its physical characteristics, structural shape, strength, etc., and this is true even when the insulation be subjected to repeated cycles of water submergence and drying out.

Other objects and advantages of this invention will appear from the description which follows.

In accordance with the present invention, the foregoing objectives are accomplished by forming the insulating pieces from a magnesia slurry containing an asphalt emulsion and by subjecting the molded pieces to certain definite conditions of curing which I have found to impart an exceptional degree of water-repellency to the insulation. Curing of the asphalt-containing type of magnesia under the conditions and time as hereinafter fully defined, imparts a much higher degree of water-repellency (i. e., it greatly decreases the rate at which water will be absorbed) than is obtained when curing under conditions either less severe or more severe than those herein contemplated, and the ability of the thus treated insulating pieces to withstand cycles of wetting and drying out is greatly enhanced.

In accordance with the teaching of this invention the baking time and temperature must be kept within certain definite limits. I have found that it is possible to decrease the water absorption rate of the material and impart an unexpectedly high degree of water-repellency to magnesia insulation containing the asphalt by baking the dried articles under dry heat conditions for periods as short as two hours or as great as ninety-six hours, provided certain temperature limits are observed.

In general, the temperature should be decreased as the baking time is increased. Thus, in a two hour bake, temperatures as low as 325° F. and as high as 479° F. have been successfully employed, whereas, in ninety-six hour bakes, temperatures as low as 241° F. and as high as 376° F. have been utilized with good results.

The preferred baking conditions, keeping in mind both the quality of the product and economical operation, involve subjecting the dried article to dry heat baking for a period of from two to twenty hours at temperature limits of 345° F. to 448° F. for a two hour bake and at temperature limits of 288° F. to 380° F. for a twenty hour bake. In other words, throughout the preferred range of baking times, the upper and lower limits of the preferred baking temperatures involve about a 100° F. spread.

As previously noted, baking periods as great as ninety-six hours can be used, and in certain cases beneficial effects are obtained with even longer baking periods, but the production rate is greatly decreased.

Figure 2:
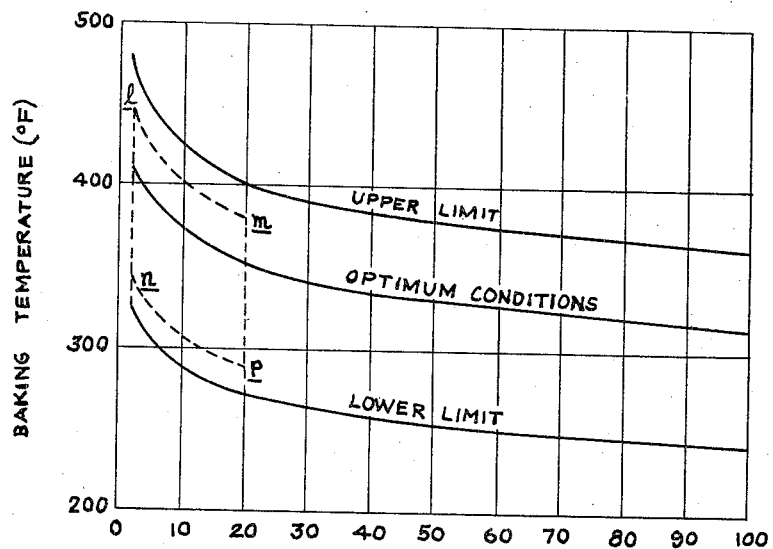

The effect of baking conditions on the water-repellency of asphaltic magnesia is illustrated by the following example and the graphs shown in Figs. 1 and 2.

Test specimen blocks of asphaltic magnesia were prepared by incorporating 1.6% of emulsified asphalt (Flinkote N–13–HPC, containing water and 62% solid asphalt of 125°–130° F. softening point) in an aqueous slurry of basic magnesium carbonate crystals and asbestos fibres. The solids in the finished slurry constituted 10% of which 8% was basic magnesium carbonate, 1% was asbestos fibres and 1% solid asphalt. This slurry was filter molded to form test blocks of 36" x 6" x 1½" (trimmed size).

After air drying at about 230° F. for one week, individual test specimens 6" x 2" x 1" were cut from the test blocks and were subjected to curing for periods of two hours, six hours, twenty-four hours and ninety-six hours. Various temperatures were employed during the curing operation for individual specimens, the temperatures ranging from 230° F. to 500° F. These cures were carried out in an electric oven. For any given run, the average temperature of the specimens was maintained within about 5° F. of the controlled test temperature.

After curing, the water-repellency of the variously treated test specimens was determined by a water absorption test carried out as follows: weighed test specimen blocks were completely submerged in water for a period of time to insure complete saturation of the specimens, i. e., for test specimens of the density here involved, an increase in weight of about 380%. (Depending on the density of the magnesia employed, complete saturation will involve a weight increase ranging from about 300–500%.) Depending upon the curing conditions (both time and temperature) to which the specimens had been subjected, the time to effect complete saturation of the specimens varied over a wide range extending all the way from a period of a few minutes to over 12 days. At various time intervals during this period of submergence, these test specimens were removed, weighed and re-submerged. From the observed weight changes, it was possible to determine the absorption rate and calculate the time when a given specimen had absorbed sufficient water to increase its weight by 50%; (hereinafter this time interval will be referred to as "50% water absorption"). This value selected as the standard of comparison of the water-repellency of magnesia since experience has shown that insulating material in which not more than 50% absorption occurs after about 25 minutes submergence possesses the desired high degree of water-repellency and the desired decreased rate of water absorption contemplated by the present invention in order to satisfactorily withstand submergence in water for times normally encountered in commercial uses.

Fig. 1 is a plot of the 50% water absorption curves of asphaltic magnesia measured by the foregoing test method. In plotting the curves the log of the time in seconds to effect 50% absorption was plotted against the baking temperature in degrees Fahrenheit for each of the four baking periods, namely, two hours, six hours, twenty-four hours and ninety-six hours, the test results being shown by the solid line curves A, B, C, and D respectively.

The doted line a—b represents the 25 minute minimum standard of satisfactory water repellency. For any given curing curve, the portions thereof lying above line a—b plot the curing conditions which will result in imparting a satisfactory degree of water repellency to the asphaltic magnesia. With reference to Fig. 1, it is noted that the ninety-six hour curve (curve D) intersects line a—b at point c (241° F.) and again at point e (376° F.). Intermediate these temperatures the 50% water absorption curve for ninety-six hours reaches a maximum at d (about 315° F.). In other words, curing an asphaltic magnesia prepared according to the foregoing procedure for ninety-six hours at about 315° F. will result in maximum water repellent characteristics being imparted to the material; good water repellent characteristics will be imparted by curing for ninety-six hours at temperatures between about 241° F. and about 376° F.; whereas at temperatures above 376° F. and below about 241° F. a ninety-six hour cure will not result in improvement of the water-repellency contemplated by the present invention.

A similar interpretation of the other curing curves illustrated in Fig. 1 will establish optimum, maximum and minimum baking temperatures for effecting cures at twenty-four hours, six hours and two hours. From these plots, it is also possible to interpolate the preferred curing conditions to be used for other baking intervals.

Tests were also carried out using untreated (non-asphaltic) 85% magnesia insulation of the same size and approximately the same density as the test specimens in the illustrative example, which had been subjected to soaking heat for twenty-four hours at various temperatures ranging from 230°–600° F. The 50% water absorption value could not be accurately measured because this point was reached in times of the order of about one second for all samples tested. This value would be represented by the line for log 0.0 on Fig. 1.

Test specimens of asphaltic magnesia were prepared by the method outlined in the first paragraph of the illustrative example. These test specimens were not subjected to prolonged baking under dry heat conditions after drying, but were merely given the normal drying treatment (i. e., drying for about one week in an oven heated to about 225°–245° F. so that the specimen temperature during the drying phase or until all the moisture had been driven off was about 130°–160° F.; thereafter or during about the last day of the drying period the specimen temperature approached that of the oven). Materials prepared in this manner were found to have 50% water absorption in one minute. This value is plotted on Fig. 1 as point Z.

From Fig. 1 it will be seen that a striking improvement in the water repellent characteristics results when asphaltic magnesias are treated by the method of this invention. Furthermore, it is to be noted that another unusual aspect of this invention is illustrated by Fig. 1, i. e., the critical nature of the time-temperature relationship, particularly as to the upper and lower limits of both conditions, in the curing of hardenable slurries of carbonated magnesias containing asphalt in order to improve their water repellency.

Fig. 2 is a graph in which the baking temperature (degrees Fahrenheit) is plotted against the baking time (hours), i. e., the time over and above the time required to first remove all the moisture from the material which is previously accomplished in the usual drying step. The temperatures plotted hereon are the upper limit, lower limit and optimum baking conditions determined from the various curves appearing in Fig. 1. The dotted line area defined by $lmnp$ comprehends the preferred baking conditions.

For the purposes of the present invention and in order to impart unusually high water repellent characteristics to 85% magnesias, it is preferred to utilize low melting asphalts. An asphalt emulsion known to the trade as N–13–HPC made by the Flinkote Company or K–89 asphalt emulsion sold by Pioneer Latex and Chemical Co. have been found to be particularly well suited for use in the process of this invention. Similarly acting materials which are hydrophobic and capable of imparting water resistance to 85% magnesias can be utilized provided the special baking conditions contemplated by this invention are observed.

N–13–HPC is an emulsion of a low melting asphalt (about 125–130° F. softening point) in water. The dispersion is effected by a small amount of bentonite clay and the solids to water ratio being about 1.0 to 2.0, although the lower limit may even approach 0.

The bentonite clay acts as an emulsifying agent, permitting the asphalt to be dispersed and remain suspended in water. After the emulsion is incorporated into the magnesia and the product dried, the bentonite apparently acts as a stabilizer to prevent the asphalt from "bleeding" out at temperatures above its melting point. Upon further heating at higher temperatures or for longer times at lower temperatures, the oils within the asphalt and the molten asphalt itself convert the bentonite from a hydrophyllic state to one of hydrophobic. As a result, the water rather than being assisted by the bentonite in being pulled into the insulation is now more than ever withheld. Other explanations for the improved water repellency appear plausible and may even be contributing factors, but regardless of the reasons, baking imparts greater water repellency.

The asphalt is preferably added to the magnesia slurry as a water emulsion since it can then be more readily and uniformly dispersed in the slurry.

Generally it is preferred to incorporate asphalt emulsion in the magnesia slurry after the asbestos fibres have been mixed and dispersed therein. The sequence of steps with respect to the incorporation of the asphalt and the form in which the asphalt is added are not deemed critical, and so long as a complete and uniform dispersion is obtained, the asphalt can be blended with the slurry at any time desired.

The quantity of asphalt to be used will vary somewhat with the particular characteristics desired in the end product. For most purposes it is presently preferred to employ about 5% to 15% asphalt in the dried product.

The ability of asphaltic magnesias to withstand submergence in water and drying out when used as an insulation covering for steam piping has been demonstrated in a series of tests which were conducted on various insulating materials including the conventional 85% magnesias. The tests were carried out as follows:

A series of steam pipes (¾" in diameter and 40" long) were arranged to run through a tank in which the water level would remain constant. On each pipe, two 16" sections of insulation were butted together and were held in place with two ¾" thin metal straps or bands. A 4" section of insulation was applied at either end of the butted sections and held in this position with a single strap. Steam was admitted to the pipes at 125 pounds gauge pressure and water was run into the tank until it reached the overflow level which was about 3" above the top of the insulations. The flow of water was automatically regulated to maintain the water temperature between about 175° F. and 185° F.

After seven hours the tank was drained and the insulation allowed to dry for seventeen hours during which steam pressure was maintained in the lines. This sequence of operations was repeated a number of times and after each cycle the conditions of the insulations were noted and compared.

As an average, the conventional 85% magnesias were found to fail between two and five cycles, whereas the asphaltic magnesia, prepared according to the present invention, was found to remain in good condition even after it had been submerged for a total of 60 cycles at which time the test was discontinued.

The asphaltic magnesias prepared in accordance with this invention ran about 0.75 pound per cubic foot heavier than the conventional magnesias. Their abrasion resistance, thermal insulating value and strength are roughly comparable.

Table 1 summarizes and compares certain of the physical properties of conventional 85% magnesia and asphaltic magnesia prepared by the method of this invention in pipe and block forms.

TABLE I

*Physical properties of asphaltic magnesia*

|  | Control Magnesia | | Asphaltic Magnesia | |
|---|---|---|---|---|
|  | Block | Pipe | Block | Pipe |
| Drainage Time, Sec | 160 | 118 | 175 | 119 |
| Density, lbs/cu. ft | 12.2 | 14.3 | 13.0 | 15.0 |
| Modulus of Rupture, p. s. i | 35.5 | 66.8 | 32.9 | 54.6 |
| P & J Hardness, mm. (dry) | 0.74 | 0.50 | 0.82 | 0.61 |
| Compression, p. s. i. at 10% Red. in Tk.: | | | | |
|   Dry | 105.5 |  | 96.2 |  |
|   Wet (after boiling 8 hrs.) | 28.2 |  | 43.7 |  |
| B. t. u./hr./sq. ft./(°F./in.) at mean temp. of: | | | | |
|   200° F |  | 0.30 |  | 0.40 |
|   300° F |  | 0.415 |  | 0.435 |
|   400° F |  | 0.45 |  | 0.47 |

I claim:

1. In a process for the manufacture of a magnesia insulation piece involving molding an aqueous slurry comprising carbonated magnesia, asbestos fibers and asphalt, said asphalt being present in a quantity which will provide from 5% to 15% by weight asphalt in the insulation piece and drying the hardened molded article at temperatures ranging from 220° F. to 400° F. for a sufficient time to remove all free moisture from the molded article, the method comprising baking the dried article after all free moisture has been removed therefrom for from 2 to 20 hours, said baking being under dry heat conditions, and the baking temperature when baking for two hours lying between limits of 345° F. to 448° F., the baking temperature when baking for twenty hours lying between limits of 288° F. to 380° F. and the baking temperature when baking for intermediate time periods lying between upper and lower limits both of which are lower as compared with the limits for two hour baking as the time is increased from two hours to twenty hours.

2. The method of claim 1 further characterized in that the aqueous slurry contains a minor amount of bentonite clay sufficient to disperse and maintain the asphalt in aqueous suspension.

3. The product produced by the method of claim 1.

References Cited in the file of this patent

UNITED STATES PATENTS

| 2,042,096 | Greider | May 26, 1936 |
| 2,423,839 | McGarvey | July 15, 1947 |

FOREIGN PATENTS

| 109,309 | Australia | Dec. 21, 1939 |